(12) United States Patent
Trainer et al.

(10) Patent No.: US 7,830,105 B2
(45) Date of Patent: Nov. 9, 2010

(54) ELECTRICAL MACHINE

(75) Inventors: David Reginald Trainer, Derby (GB); John James Anthony Cullen, Derby (GB); Stephen Andrew Long, Sheffield (GB)

(73) Assignee: Rolls-Royce PLC (GB)

( * ) Notice: Subject to any disclaimer, the term of this patent is extended or adjusted under 35 U.S.C. 154(b) by 318 days.

(21) Appl. No.: 12/176,663

(22) Filed: Jul. 21, 2008

(65) Prior Publication Data

US 2009/0039652 A1 Feb. 12, 2009

(30) Foreign Application Priority Data

Aug. 9, 2007 (GB) ................... 0715472.7

(51) Int. Cl.
*H02P 6/14* (2006.01)
*G05B 19/40* (2006.01)

(52) U.S. Cl. ............... 318/400.26; 318/701; 322/89

(58) Field of Classification Search ............ 318/400.26, 318/701, 671, 714, 567; 322/89
See application file for complete search history.

(56) References Cited

U.S. PATENT DOCUMENTS

| 5,010,267 | A | 4/1991 | Lipo et al. | |
|---|---|---|---|---|
| 7,388,367 | B2 * | 6/2008 | Stauder et al. | 324/207.25 |
| 2002/0007975 | A1 * | 1/2002 | Naito et al. | 180/65.3 |
| 2003/0052632 | A1 * | 3/2003 | Wissmach et al. | 318/362 |
| 2006/0232069 | A1 * | 10/2006 | Lim et al. | 290/1 R |
| 2006/0232251 | A1 * | 10/2006 | Lim et al. | 322/89 |
| 2007/0252587 | A1 * | 11/2007 | Stauder et al. | 324/207.15 |
| 2009/0206607 | A1 * | 8/2009 | Nakamura et al. | 290/44 |
| 2010/0045221 | A1 * | 2/2010 | Trainer et al. | 318/400.26 |

FOREIGN PATENT DOCUMENTS

EP 0664601 A1 1/1995

* cited by examiner

*Primary Examiner*—Paul Ip
(74) *Attorney, Agent, or Firm*—McCormick, Paulding & Huber LLP

(57) ABSTRACT

Embedding electrical machines in gas turbine engines has particular advantages by avoiding the need to provide mechanical connections. However, electrical machines such as switched reluctance electrical machines require relatively large electrical capacitors to accommodate and filter voltage variations in the phases of the electrical machine. Generally, the electrical machine will have a motoring period or generating period with a spacer period between. By injecting electrical current as electrical power in the spacer period, there is limited effect upon net torque within the electrical machine or electrical power generation. However, such stored electrical power in an inductive winding element of the electrical machine augments power pulses provided by a power source incorporating an electrical capacitor. In such circumstances, a smaller sized electrical capacitor can be used.

30 Claims, 2 Drawing Sheets

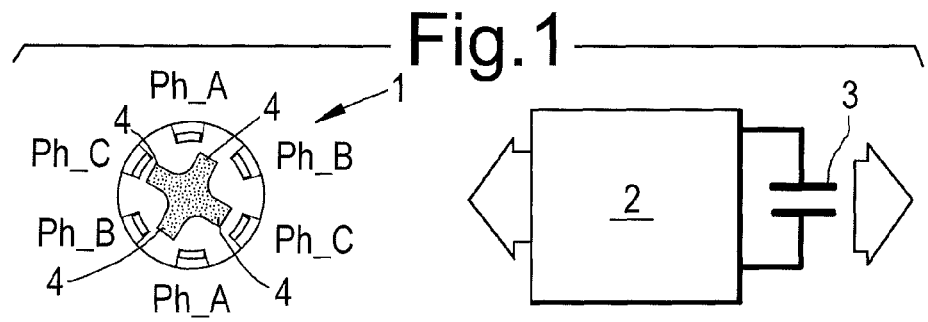
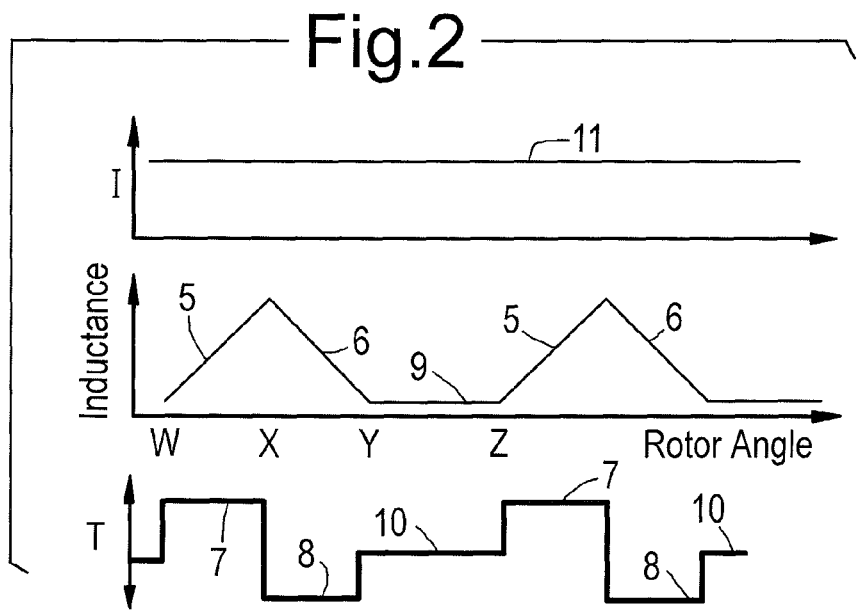
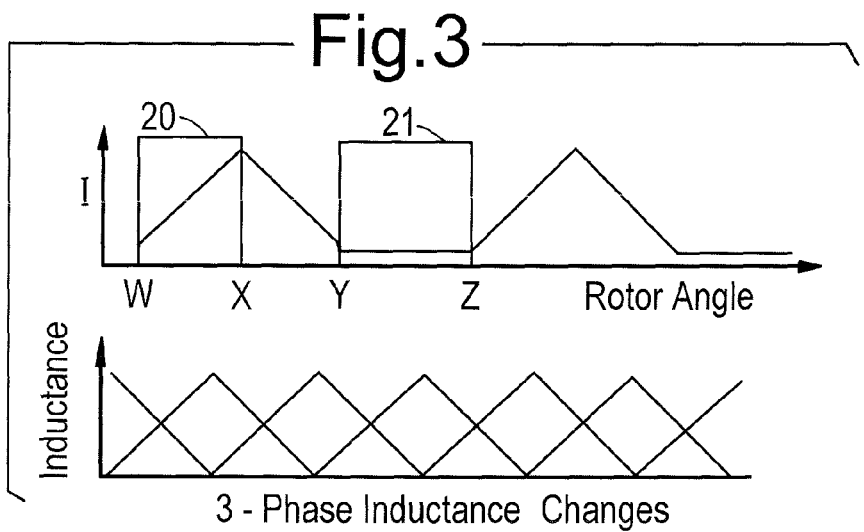

ELECTRICAL MACHINE

CROSS REFERENCE TO RELATED APPLICATION

This application is entitled to the benefit of British Patent Application No. GB 0715472.7 filed on Aug. 9, 2007.

FIELD OF THE INVENTION

The present invention relates to electrical machines and, more particularly, to electrical machines such as switched reluctance electrical machines in which electrical current is injected in order to provide a motoring function or a generating function.

BACKGROUND OF THE INVENTION

Electrical machines are utilized in a wide range of environments and for a large number of purposes. Of particular interest with regard to aspects of the present invention is utilization of electrical machines within gas turbine engines. These electrical machines are utilized for provision of electrical generating capacity as well as in order to act as electrical motors for various functions. There is a desire to locate such electrical machines as closely as possibly and preferably embedded within the gas turbine engine. By such an approach, complex mechanical transmission mechanisms are removed giving significant operational and efficiency benefits.

As indicated above, such electrical machines can act as generators as well as starter motors for the gas turbine engine. The electrical machine in normal operation as indicated would generally act as an electrical generator but during such starting functions it will be understood that the electrical machine will temporarily act as a motor. Generation systems typically utilize power electronic converters to enable very high power density electrical machine technologies to be used. Such technologies include switched reluctance electrical machines. High densities enable further size and weight benefits to be achieved in comparison with traditional synchronous electrical machines. Additionally, the inherent direct electrical current interface allows parallel connection and sharing of electrical power generated by different spools of the gas turbine engine.

Whilst there are significant benefits with regard to embedding electrical machines within a gas turbine engine, it will also be understood that by such location it is necessary for the machines to have a high level of reliability and availability. The robustness of switched reluctance electrical machines has attractions but the necessity of a large electrical capacitance for the direct electrical bus interface can create significant size and weight problems. The traditional approach with regard to land based electrical machines is to use an electrolytic capacitor but such capacitors are not conveniently available for aerospace situations due to their limitations in terms of operating temperature, capacitance stability, a limited life and orientation. In such circumstances, less capacitively dense technologies, such as film-foil, are required but in view of the lower capacitive density, it will be appreciated that there are large weight and size penalties incurred.

SUMMARY OF THE INVENTION

In accordance with aspects of the present invention there is a provided an electrical machine arrangement comprising inductive winding elements cyclically energizable for an electrical motor function by a power pulse given by a power source to generate continuous torque in a rotor, each power pulse provided during a motor period in a rotational cycle and separated by spacer periods to facilitate rotation of the rotor, the inductive winding elements coupled to an electrical power injector to inject electrical power for storage in the inductance element during the spacer periods to augment the power pulse provided by the power source.

Also, in accordance with aspects of the present invention, there is provided a method of operating an electrical machine, the method comprises cyclically energising an inductive winding elements to generate continuous torque in a rotor by applying a power pulse from the power source during motor periods in a rotational cycle and additionally injecting electrical energy to the inductive winding elements during spacer periods of the rotational cycle for storage in the inductance element and determining the value of the injected electrical energy to adjust the necessary capacity of the power source.

Normally, each inductive winding element is an electrical coil or winding. Generally, the electrical machine is a switched reluctance electrical machine capable of providing a generating and/or motoring function.

Typically, the power source is a capacitor. Generally, the capacitor is a film foil capacitor.

Normally, the power pulse is followed by a generator period. Possibly, electrical energy is injected into the inductive winding elements during its generator period.

Typically, there is a plurality of inductive winding elements. Generally each inductive winding element shares electrical power at least in the spacer period with other inductive winding elements.

Possibly, the injected electrical power provides a negative torque to the continuous torque upon the rotor. Generally, the negative torque is within a 10% reduction range of the continuous torque as presented to the rotor.

Generally, the motor (or generator) period and the spacer period are defined by rotational angles of the rotational cycle subtended by the rotor.

Possibly, the electrical power injector is associated with a monitor for the power source to determine voltage disturbances in the power source and dependent upon any voltage disturbance adjust the value and/or period of injection of electrical pulse to the inductive winding element in the spacer period. Possibly, the monitor also determines whether an electrical pulse or part of an electrical pulse is injected in the generator (or motor) period.

BRIEF DESCRIPTION OF THE DRAWINGS

FIG. 1 is a schematic illustration of an electrical machine configuration in accordance with aspects of the present invention;

FIG. 2 provides graphic representations illustrating the inductance variation for a constant electrical current excitation along with time-varying torque presented to a rotor as illustrated in FIG. 1;

FIG. 3 is a graphic representation of idealised inductance variation compared to injected electrical energy over rotational angles for an electrical machine in accordance with a first embodiment of aspects of the present invention;

DETAILED DESCRIPTION OF THE PREFERRED EMBODIMENTS

Figure 4:
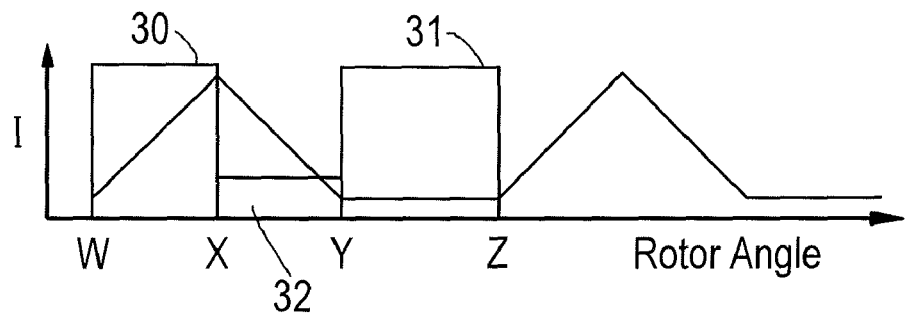
FIG. 4 is a graphic representation of electrical energy injection over rotational angle for a second embodiment of an electrical machine in accordance with aspects of the present invention; and, FIG. 5 provides illustrations of electrical current flow with regard to a motoring period, electrical energy injection during a spacer period and electrical energy injection during a generator period of an electrical machine operating as a motor.

Electrical machines as described above are used in a wide variety of situations. Of particular interest with regards to aspects of the present invention are switched reluctance electrical machines in which power pulses are provided to inductive winding elements in order to generate rotation. The electrical inductive winding elements are typically stator windings, which are cyclically and sequentially energized in order to provide and stimulate rotation in the rotor.

FIG. 1 provides a schematic illustration of an electrical machine arrangement in accordance with aspects of the present invention. Thus, a switched reluctance electrical machine 1 comprises a number of inductance element pairs Ph-A, Ph-B and Ph-C. These inductance elements Ph as indicated are energised by injecting electrical power pulses in the form of electrical current presented from a power source 2. The electrical machine 1 illustrated in FIG. 1 is three phase in that there are three pairs of inductance elements Ph energised by electrical current injection from the power source 2. The power source 2 is associated with a capacitor 3, which acts to ensure that rapid switching of the power pulses to the inductance elements Ph can be achieved.

As indicated above the electrical machine arrangement in the embodiment depicted in accordance with aspects of the present invention there is a switched reluctance electrical machine, which can operate as an electrical power generator or an electrical motor. Thus, in situations such as with regard to a gas turbine engine the electrical machine can initiate start up of that gas turbine engine and then once that function has been achieved can operate subsequently as an electrical power generator.

For illustration purposes, FIG. 2 shows the idealised inductance variation in the inductance elements Ph over rotational angle for a rotational cycle between W and Z with a constant electrical current excitation of an inductance element. It is known that electrical inductance observed by stator windings as electrical inductance elements Ph changes as the rotor sequences through its rotational cycle W to Z. Such variations in the electrical inductance are due to rotor poles 4 of the machine 1 moving into and out of alignment with the inductance elements Ph. As indicated, FIG. 2 shows idealised inductance changes ignoring saturation effects along with corresponding torque variations for a fixed injected electrical current to the stator windings or inductance elements Ph by the source 2.

Injection of electrical current as a power pulse during a rising inductance or motor period 5 causes the machine 1 to act as an electrical motor whereas injection of electrical current during a falling inductance or generator period 6 causes the machine 1 to behave as an electrical power generator.

With regard to torque it will be noted during the motor period 5, that is to say through the rotation angle W to X there is a positive or constant torque production 7 whilst electrical current injection during the generator period 6, that is to say over rotational angle X to Y leads to a negative torque 8. This is to be expected in an electrical machine, which can be configured as an electrical motor or an electrical generator. Of particular interest, with regard to aspects of the present invention, is a flat or spacer period 9 over rotational angles Y to Z. This spacer period 9 constitutes rotational angles where the rotor poles 4 are not in alignment with or influenced by the inductance elements Ph so that there is limited effect upon electrical machine 1 performance and as illustrated in FIG. 2 zero torque along flat line 10. As indicated, FIG. 2 is an idealised representation but provides a basic understanding of an electrical machine 1. It will be understood that the injected electrical current 11 in a practical electrical machine will not be as constant as illustrated in FIG. 2 but rather pulsed in the respective motor period 5 or generator period 6 as required by particular electrical machine performance criteria.

Aspects of the present invention utilise the spacer period 9 to effectively store electrical energy. It will be appreciated that during the spacer period 9 any electrical power injected as electrical current can lead to no torque production due to the misalignment of the poles 4 and inductance elements Ph. Thus, during this spacer period 9, it will be understood that the machine 1 can store electrical energy in accordance with the relationship, stored electrical energy equals $\frac{1}{2} LI^2$ where L is the inductance and I is the electrical current.

As indicated above, in normal operation, the electrical machine as a switched reluctance machine is limited to either motoring or generating by carefully controlling the rotational angles at which electrical current as power pulses is injected into the inductance elements as stator windings, that is to say over rotational angles W to X or X to Y.

By aspects of the present invention as indicated, electrical energy can be stored at least during the spacer period 9 which results in a reduced duty load to the capacitor 3. Thus, the electrical energy storage functionality normally provided solely in prior electrical machines by the capacitor 3 is augmented in the present machine by the electrical inductance element Ph having energy stored and released over the spacer period 9 defined by appropriate rotational angles Y to Z during each rotor rotational cycle. During the spacer periods 9, as indicated, each phase of the electrical machine is allowed to store and release energy appropriately in order to augment the capacitor 3 in terms of the power pulse provided to the machine 1. Such an approach will allow a reduction in the size as well as weight of the capacitor component necessary to achieve operational performance. It will be appreciated that injection of electrical power in the form of electrical current in the spacer period effectively enables provision of a controlled active filter for the electrical machine.

FIG. 3 illustrates electrical current injection as a power pulse for torque generation and electrical current injection as inject electrical power for storage in accordance with aspects of the present invention in relation to changes in inductance for a three phase, that is to say three inductive winding elements, electrical machine. As illustrated, each phase successfully takes over an additional active filtering operation in accordance with aspects of the present invention. In such circumstances, the active filtering operation is continuously available, that is to say electrical energy is stored in the inductive winding element to offset and augment the power source (electrical capacitor 3) in terms of the electrical capacitance capability required for operational performance. Thus, the inductive winding elements of the electrical machine effectively share electrical energy in order to distribute that electrical energy for storage in the spacer period 9. There is a changeover period between spacer periods 9 for each phase of the electrical machine and this changeover period is largely determined by the mechanical design of the machine. The changeover period can be adjusted and optimised to obtain the maximum benefit from additional filtering and energy storage by exchange of electrical energy between the inductive winding elements during the changeover period. It will be noted that the inductance of the inductive winding elements during a preferred filtering period is at its lowest value during its preferred filtering period such that the electrical current can be rapidly controlled by the power source to give the desired wave forms to optimise rating and performance of the machine driven system.

Referring back to FIG. 2, it can again be noted that the injected electrical current or electrical power in the spacer period 9 has no effect upon torque production and therefore has no detrimental effect on motoring or generating capacity of the electrical machine. FIG. 3 shows for an example motoring configuration for the electrical machine electrical current injection 20 occurs during a motoring period 5 (rotational angle W to X) such that electrical current injection as electrical power in the period 21 can be provided without a negative effect upon the nett torque provided by the electrical machine.

As indicated above, injection of electrical power for storage in the inductive winding element in the spacer period should generally have negligible effects upon the nett torque generation. However, it will also be appreciated with regard to a motoring function the generator period 6 (rotational angle X to Y) will, if electrical current is injected, cause a negative torque in the opposite direction to the normal torque provided by the motoring function. In such circumstances the nett torque provided by the electrical machine in the motoring function would be diminished. However, in some circumstances in order to provide the benefits with regard to reduction in the necessary capabilities of the power source and in particular the capacitance of that power source it may be desirable to inject small values of electrical current or electrical energy in the opposing generating phase (generator period 6). Such an approach as indicated will have a detrimental effect upon torque production but may allow a much smaller electrical capacitance to be utilized and therefore make the electrical machine more practical in some installations. For example an electrical machine designer may accept a 10% reduction in nett torque as a penalty for an overall reduction in electrical machine size and weight.

FIG. 4 illustrates variations in inductance within an inductive winding element as electrical current or energy is injected into an inductance element. Thus, as can be seen in the motoring function, an electrical current 30 is injected during the motoring period 5 and as, with regard to FIG. 3, electrical energy in the form of injected electrical current 31 injected during a spacer period is stored in the inductance element but in addition further electrical energy in the form of an injected current 32 is provided during a generator period 6. It will be noted that the injected electrical current 32 as electrical power for storage is generally of a much lower value in order to limit the negative torque generation in comparison with the progressive torque provided by the motoring injected electrical current 30. Nevertheless, by a combination of the injected electrical current 31 and the generator injected electrical current 32 electrical energy is stored within the inductance element in order to augment the power source, that is to say the electrical capacitor in terms of its functionality when again a further motoring electric current pulse injection 30 is required.

In the above circumstances, it can be considered that electrical energy injected for storage during the spacer period is in a dead phase of the electric motor whilst electrical current injected as electrical energy for storage in the generating period 6 is in an opposing phase.

Figure 5:
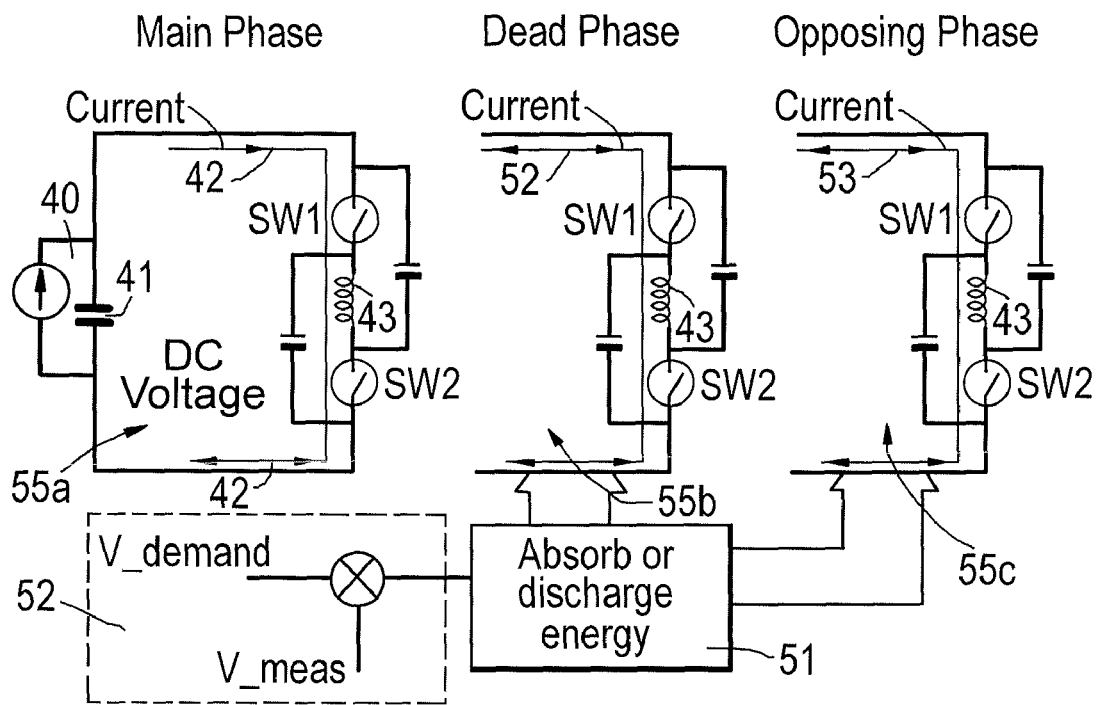

In practice operation and control of the dead phase and the opposing phase to store and release electrical energy may be managed by a closed loop control system. This closed loop control system will utilise a monitor to respond to voltage disturbances in the power source and in particular the direct electrical current capacity utilized for providing the power pulses to the inductance elements to provide generator or motoring functions. FIG. 5 schematically illustrates circuitry to provide operation of the electrical machine in a main phase, that is to say to provide nett motoring torque to an electrical machine in comparison with a dead phase electrical energy injection to the inductance element for storage during a spacer period and for comparison with injection during an opposing phase that is to say generating period 6 (FIG. 2).

In the main phase (shown by circuit 55c) utilized for illustration purposes as indicated the electrical machine will be providing a motoring function. In such circumstances a power source 40 including a capacitance 41 causes electrical current 42 to flow in the direction of the arrowheads for inductance element 43 in the form of a winding or coil. In such circumstances in this phase of the electrical machine as indicated a motoring function is achieved. The electrical current 42 is only applied for a period defined by a rotational angle for a rotor within the electrical machine in order to generate the nett torque as indicated. Control of such current 42 flow is achieved through switches SW1 and SW2. These switches when closed will allow electrical current to flow through the inductance element 43 but when opened will reverse bias the inductance element 43 leading to defluxing of the inductance element 43. This rapid change between the application of electrical current during the motoring period 5 and defluxing can cause voltage disturbances in the capacitor 41. In such circumstances as depicted in FIG. 5 a monitor 52 is provided to compare voltage demand (V demand) to measured voltage (V meas). In such circumstances dependant upon the voltage disturbance the controller 51 will either absorb or discharge energy from the inductance element 43. Such absorption or discharge of electrical energy for storage in the inductance element 43 may result in an electrical current 52, 53 flowing into or out of the inductance element 43 dependant upon determination by the monitor 52 of voltage disturbances in the capacitor 41 of the power source 40. Such injection will be through an electrical power controller device 51 but typically associated with the monitor 52.

The value of injected electrical power in the dead phase (shown as circuit 55b) or opposing phase (shown as circuit 55c) will depend on the disturbance in the voltage as indicated and determined by the monitor. Generally a desired level of energy storage within the inductance element 43 will be achieved. Particularly with regard to the opposed phase flow 53 as indicated such injection of electrical current as electrical energy will oppose the main function of the electrical machine and therefore consideration must be made as to that detrimental effect in comparison with the benefits of reduction in capacitor 41 size.

Although illustrated with regard to a motoring function it will also be appreciated that the inductance element 43 can be operated in a generator mode consistent with generator period 6 as depicted in FIG. 2. In such circumstances electrical current will be injected into the electrical machine in the generator period 6 in order that the electrical machine acts as an electrical generator in accordance with aspects of the present invention. Thus, again electrical energy can be stored in the spacer period 9 with limited if any detrimental effect upon generating function whilst electrical energy injected during the motor period 5 will have a detrimental effect upon electrical power generation.

Although described with regard to a three phase switched reluctance machine, it will be appreciated that machines with other phase numbers such as 4 phase or 5 phase systems may also be utilized with appropriate switching to achieve electrical current injection and electrical power injection for storage in the inductance element.

Aspects of the present invention may be utilized with regard to other electrical machine types using an electrical power source. For example a three phase permanent magnet drive using a trapezoidal rather than sinuszoidal modulation will normally rely on only energising two of the three phases at one time effectively leaving the third phase as a dead phase. This dead phase can be used to store electrical energy in accordance with aspects of the present invention and to reduce the electrical capacitance capability requirements for that electrical machine. The unused phase could be controlled to provide additional filtering and as indicated energy storage.

Aspects of the present invention have particular applicability with regard to electrical machines where size, weight and cost of installation of equipment are concerns and must be minimised. Such applications include with regard to aerospace, mining, industrial and energy businesses.

Modifications and alterations to aspects of the present invention will be understood by those skilled in the art. Thus for example with regard to electrical power injection for storage in the inductance element it will be appreciated that this injection may be pulsed rapidly in order to trim and adjust any oscillating and disturbance effects upon electrical machine operation.

What is claimed is:

1. An electrical machine comprising:
   a rotor;
   inductive winding elements;
   a power source; and
   an electrical power injector,
   wherein the inductive winding elements are cyclically energisable for an electrical motor function by a power pulse given by the power source to generate continuous torque in the rotor, each power pulse provided during a motor period or generator period in a rotational cycle and separated by spacer periods to facilitate rotation of the rotor, the inductive winding elements coupled to the electrical power injector to inject electrical power for storage in the inductive winding elements during the spacer periods to augment the power pulse provided by the power source.

2. The machine as claimed in claim 1 wherein each inductive winding element is an electrical coil or winding.

3. The machine as claimed in claim 1 wherein the electrical machine is a switched reluctance electrical machine capable of providing a generating and/or motoring function.

4. The machine as claimed in claim 1 wherein the power source includes a capacitor.

5. The machine as claimed in claim 4 wherein the capacitor is a film foil capacitor.

6. The machine as claimed in claim 1 wherein the motoring power pulse is followed by a generator period.

7. The machine as claimed in claim 6 wherein the electrical power injector injects electrical energy into the inductive winding elements during the generator period.

8. The machine as claimed in claim 1 wherein there is a plurality of inductive winding elements.

9. The machine as claimed in claim 8 wherein each inductive winding element shares electrical power at least in the spacer period with other inductive winding elements.

10. The machine as claimed in claim 1 wherein the injected electrical power provides a negative torque to the net torque upon the rotor.

11. The machine as claimed in claim 10 wherein the negative torque is within a 10% reduction range of the net torque as presented to the rotor.

12. The machine as claimed in claim 1 wherein the motor period and the spacer period are defined by rotational angles of the rotational cycle subtended by the rotor.

13. The machine as claimed in claim 1 wherein the electrical power injector is associated with a monitor for the power source to determine voltage disturbances in the power source and dependent upon any voltage disturbance adjust the value and/or period of injection of electrical pulse to the inductive winding element in the spacer period.

14. The machine as claimed in claim 13 wherein the monitor also determines whether an electrical pulse or part of an electrical pulse is injected in the generator period.

15. A method of operating an electrical machine, the electrical machine comprising a rotor, inductive winding elements, a power source and an electrical power injector, the method comprises the steps of:
   cyclically energising the inductive winding elements to generate net torque in the rotor by applying a power pulse from the power source during motor periods or generator periods in a rotational cycle;
   injecting electrical energy from the electrical power injector to the inductive winding elements during spacer periods of the rotational cycle for storage in the inductive winding elements; and
   determining the value of the injected electrical energy to adjust the necessary capacity of the power source.

16. A method as claimed in claim 15 wherein each inductive winding element is an electrical coil or winding.

17. A method as claimed in claim 15 wherein the electrical machine is a switched reluctance electrical machine capable of providing a generating and/or motoring function.

18. A method as claimed in claim 15 wherein the power source includes a capacitor.

19. A method as claimed in claim 18 wherein the capacitor is a film-foil capacitor.

20. A method as claimed in claim 15 wherein the motoring power pulse is followed by a generator period.

21. A method as claimed in claim 20 wherein electrical energy is injected into the inductive winding element during the generator period.

22. A method as claimed in claim 15 wherein there is a plurality of inductive winding elements.

23. A method as claimed in claim 22 wherein each inductive winding element shares electrical power at least in the spacer period with other inductive winding elements.

24. A method as claimed in claim 15 wherein the injected electrical power provides a negative torque to the nett torque upon the rotor.

25. A method as claimed in claim 24 wherein the negative torque is within approximately a 10% reduction range of the net torque as presented to the rotor.

26. A method as claimed in claim 15 wherein the motor period and the spacer period are defined by rotational angles of the rotational cycle subtended by the rotor.

27. A method as claimed in claim 15 wherein the electrical power injector is associated with a monitor for the power source to determine voltage disturbances in the power source and dependent upon any voltage disturbance adjust the value and/or period of injection of electrical pulses to the inductive winding element in the spacer period.

28. A method as claimed in claim 27 wherein the monitor also determines whether an electrical pulse or part of an electrical pulse is injected.

29. A gas turbine engine comprising:
   an air intake;
   a propulsive fan;
   a compressor;

a combustor;
a turbine;
an exhaust nozzle; and
an electrical machine having
- a rotor,
- inductive winding elements,
- a power source, and
- an electrical power injector,
- wherein the inductive winding elements are cyclically energisable for an electrical motor function by a power pulse given by the power source to generate continuous torque in the rotor, each power pulse provided during a motor period or generator period in a rotational cycle and separated by spacer periods to facilitate rotation of the rotor, the inductive winding elements coupled to the electrical power injector to inject electrical power for storage in the inductive winding elements during the spacer periods to augment the power pulse provided by the power source.

30. A method of operating a gas turbine engine that incorporates an electrical machine having a rotor, inductive winding elements, a power source and an electrical power injector, the method comprises the steps of:
- cyclically energising the inductive winding elements to generate net torque in the rotor by applying a power pulse from the power source during motor periods or generator periods in a rotational cycle;
- injecting electrical energy from the electrical power injector to the inductive winding elements during spacer periods of the rotational cycle for storage in the inductive winding elements; and
- determining the value of the injected electrical energy to adjust the necessary capacity of the power source.

* * * * *